United States Patent
Qiao et al.

(10) Patent No.: US 12,122,855 B2
(45) Date of Patent: Oct. 22, 2024

(54) METHOD FOR EXTRACTING PULLULAN POLYSACCHARIDE FROM HIGH-VISCOSITY FERMENTATION BROTH

(71) Applicant: TIANJIN UNIVERSITY OF SCIENCE AND TECHNOLOGY, Tianjin (CN)

(72) Inventors: Changsheng Qiao, Tianjin (CN); Ganggang Cheng, Tianjin (CN); Liang Lu, Tianjin (CN); Tingbin Zhao, Tianjin (CN); Zhenhai Li, Tianjin (CN)

(73) Assignee: TIANJIN UNIVERSITY OF SCIENCE AND TECHNOLOGY, Tianjin (CN)

( * ) Notice: Subject to any disclaimer, the term of this patent is extended or adjusted under 35 U.S.C. 154(b) by 0 days.

(21) Appl. No.: 18/627,748

(22) Filed: Apr. 5, 2024

(65) Prior Publication Data
US 2024/0247082 A1    Jul. 25, 2024

Related U.S. Application Data

(63) Continuation of application No. PCT/CN2022/114968, filed on Aug. 26, 2022.

(30) Foreign Application Priority Data

Oct. 11, 2021    (CN) .......................... 202111180191.0

(51) Int. Cl.
C08B 37/00    (2006.01)
(52) U.S. Cl.
CPC ...... *C08B 37/0003* (2013.01); *C08B 37/0018* (2013.01)
(58) Field of Classification Search
CPC ...................... C08B 37/0003; C08B 37/0018
See application file for complete search history.

(56) References Cited

U.S. PATENT DOCUMENTS

| | | | |
|---|---|---|---|
| 2003/0225263 A1 | 12/2003 | Gaddy et al. | |
| 2021/0017557 A1* | 1/2021 | Sieker ...................... | C12N 1/02 |

FOREIGN PATENT DOCUMENTS

| | | | | | |
|---|---|---|---|---|---|
| CN | 1216780 | * | 5/1999 | ............. | C12P 19/10 |
| CN | 1216780 A | | 5/1999 | | |
| CN | 103172757 A | * | 6/2013 | ............. | C08B 37/00 |
| CN | 103626885 A | | 3/2014 | | |
| CN | 103739879 A | * | 4/2014 | ................ | C08J 5/18 |
| CN | 107056961 A | | 8/2017 | | |
| CN | 107557399 A | | 1/2018 | | |
| CN | 113735991 A | | 12/2021 | | |
| JP | S63283593 A | | 11/1988 | | |

OTHER PUBLICATIONS

Liu et al., A simple method for the simultaneous decoloration and deproteinization of crude levan extract from Paenibacillus polymyxa EJS-3 by macroporous resin. Bioresource Technol., 210, vol. 101: 6077-6083. (Year: 2010).*
Liu et al., Preparative Separation and Purification of Rebaudioside A from Steviol Glycosides Using Mixed-Mode Macroporous Adsorption Resins. J. Agric. Food Chem., 2011, vol. 59: 9629-9636 (Year: 2011).*
Wang et al., Deproteinization of gellan gum produced by Sphingomonas paucimobilis ATCC 31461. J. Biotechnol., 2007, vol. 128: 403-407. (Year: 2007).*
Notification to Grant Patent Right for Invention issued in counterpart Chinese Patent Application No. 202111180191.0, dated Apr. 29, 2022.

* cited by examiner

*Primary Examiner* — Ganapathirama Raghu
(74) *Attorney, Agent, or Firm* — Westbridge IP LLC

(57) ABSTRACT

A method for extracting pullulan polysaccharide from high-viscosity fermentation broth includes following steps: (1) removing cells from the fermentation broth; (2) removing proteins; (3) decolorizing by macroporous resin adsorption; (4) removing ions by ultrafiltration; and (5) drying, crushing and packaging. In the extraction method of the present application, by using natural polymer bioflocculant chitosan, the high-viscosity fermentation broth can be processed without dilution and addition of filter aids and organic solvents for alcohol precipitation, which reduces the pressure of subsequent decolorization, properly recycles the cell proteins, and avoids the potential hazard of the organic solvents. The method can obtain high-purity pullulan polysaccharide, improving the product yield and quality, reducing solid waste, reducing the production cost, and achieving a safe, efficient, continuous and automated production process.

11 Claims, 1 Drawing Sheet

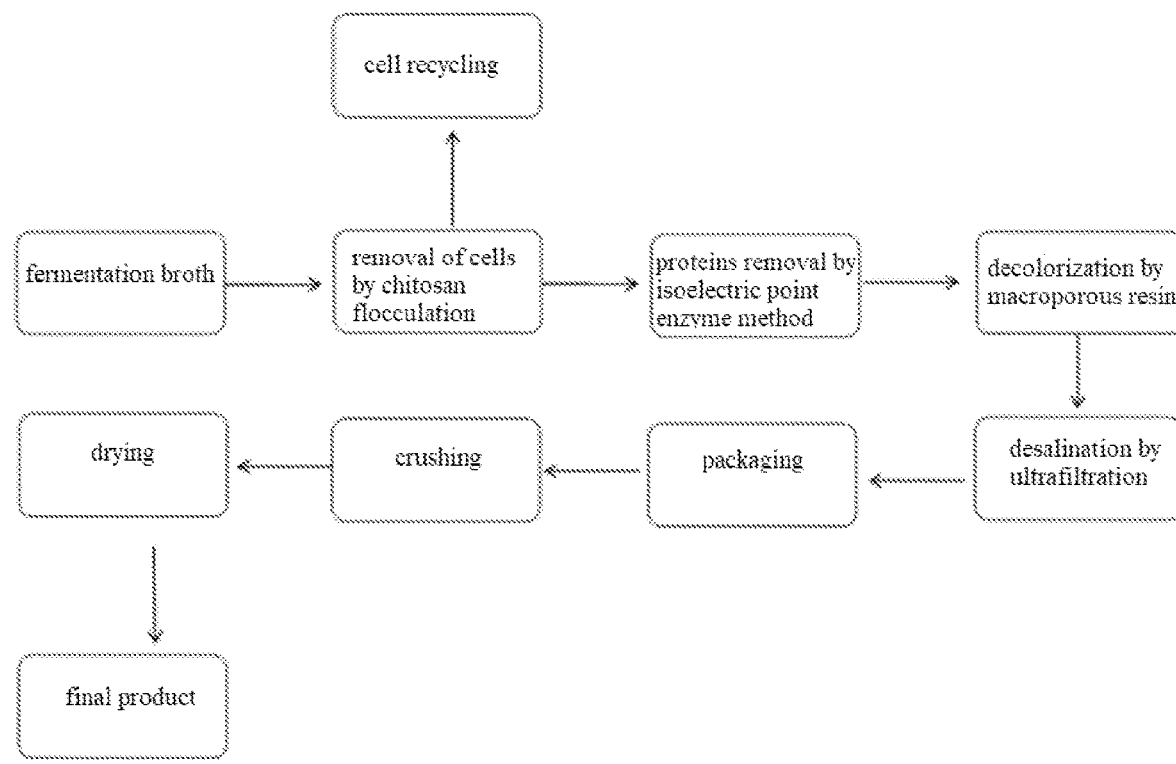

METHOD FOR EXTRACTING PULLULAN POLYSACCHARIDE FROM HIGH-VISCOSITY FERMENTATION BROTH

CROSS-REFERENCE TO RELATED APPLICATIONS

This application is a continuation of International Application No. PCT/CN2022/114968, filed on Aug. 26, 2022, which claims priority to Chinese Patent Application No. 202111180191.0, filed on Oct. 11, 2021. The disclosures of the above-mentioned applications are hereby incorporated by reference in their entireties.

TECHNICAL FIELD

The present application belongs to the field of biotechnology and relates to industrial production technology of pullulan polysaccharide, specifically to a method for extracting pullulan polysaccharide from high-viscosity fermentation broth.

BACKGROUND

Pullulan polysaccharide is a macromolecular exopolysaccharide produced by fermentation of *Aureobasidium pullulans*, also called pururan or pullulan. It is a water-soluble amorphous glucan polysaccharide and a representative of water-soluble model polysaccharides. Pullulan polysaccharide is mainly produced by linking three glucoses through α-1,4-glycosidic bonds to form maltotriose, and linking maltotrioses through α-1,6-glycosidic bonds to form a high molecular weight linear polysaccharide. The ratio of α-1,4-glycosidic bonds to α-1,6-glycosidic bonds is 2:1, the degree of polymerization is 200-5,000, and the average molecular mass is 40,000-2,000,000 Daltons. Pullulan polysaccharide has many excellent properties such as good solubility, adhesion, plasticity, stability, safety and pollution-free. The solution of pullulan polysaccharide can be directly made into film, which has the advantages of oil resistance, good oxygen barrier, strong hardness, strong elasticity, transparency, edibility, and so on, and thus widely used in the preservation of fruits, vegetables and meat. Pullulan polysaccharide is also widely used in pharmaceutical and cosmetic industry. Relevant research was carried out abroad earlier, especially in Hayashihara of Japan, where relatively systematic research has been carried out on production process and application.

China carried out relevant research relatively late. Nowadays, some relevant articles and patents have been published, and a few companies have carried out industrial production. Overall, it is still in the research stage, the extraction process of which is immature. Due to the high-viscosity of the fermentation broth, it is difficult to process the fermentation broth of high-viscosity directly by traditional methods. It requires dilution treatment to reduce the viscosity, which increases water consumption and workload. Moreover, technical bottlenecks also exist in the use of inorganic flocculants and organic solvents, as well as some filter aids in the traditional extraction process, which are not only costly but also result in organic solvent residues and solid wastes that cannot be regenerated, consuming a lot of resources. For example, in the traditional plate and frame filtration for cell removal, filter aids (diatomite) need to be added, and the fermentation broth needs to be diluted twice, which not only results in the discharge of a large amount of solid waste and environment pollution, but also the failure of the cell protein recycling, resulting in a waste of resources. A large amount of dilution treatment causes a waste of water resources, and also increases the pressure of the subsequent ultrafiltration treatment.

SUMMARY

In view of the defects in the existing methods for extracting pullulan polysaccharide, the purpose of the present application is to provide a novel method for extracting pullulan polysaccharide.

The method uses natural polymer bioflocculant (chitosan) without dilution treatment, and it greatly reduces water consumption and eliminates the need of filter aids and organic solvents for alcohol precipitation. It uses a small amount of natural polymer bioflocculant to remove cell impurities in high-viscosity fermentation broth. It can also adsorb some pigments and reduce the pressure on the subsequent decolorization. It can well recycle cell proteins. It uses an isoelectric point-enzyme method to remove proteins in the fermentation broth and macroporous resin for decolorization. When the pullulan polysaccharide in the fermentation broth reaches a certain concentration, it is directly vacuum dried to obtain pullulan polysaccharide with higher purity, avoiding potential hazards of organic waste, improving product yield and quality, reducing solid waste, and lowering production costs.

In order to achieve the above purposes, the present application provides following technical solutions.

A method for extracting pullulan polysaccharide from a high-viscosity fermentation broth, includes following steps:
(1) removal of cells from the fermentation broth, including: adjusting the high-viscosity fermentation broth to a pH of 3-5 with HCl solution, adding chitosan dissolved in glacial acetic acid for flocculation, maintaining temperature, leaving to stand, and centrifuging to remove the cells and insoluble substance, so as to obtain cell-free fermentation broth;
(2) removal of proteins, including: adjusting the cell-free fermentation broth to a pH of 8-9 with NaOH solution, leaving to stand, centrifuging, then adding alkaline protease in supernatant, heating and maintaining temperature, deactivating the protease, and centrifuging to remove the proteins;
(3) decolorization, including: adjusting the resultant fermentation broth from step (2) to a pH of 3-5 with HCl solution, adding macroporous resin therein, heating and maintaining temperature, and stirring, so as to adsorb and remove pigments, and then filtering to recycle the macroporous resin;
(4) removal of ions by an ultrafiltration membrane module, including: subjecting the resultant fermentation broth from step (3) to ultrafiltration for desalination through the ultrafiltration membrane module, and repeating the ultrafiltration until pullulan polysaccharide reaches a concentration of 5-8 g/100 mL; and
(5) drying, crushing and packaging.

The extraction method according to the present application can be applied to high-viscosity fermentation broth with a viscosity of 200-350 mPa·s.

Preferably, in step (1), chitosan is dissolved in glacial acetic acid and then added to the high-viscosity fermentation broth, with a concentration of chitosan being 0.6-1.0 g/L. The resultant mixture is heated to a temperature of 30-50° C., left to stand for 10-30 mins, and centrifuged by a speed of 4,000-5,000 rpm to recycle the cell protein.

Preferably, when chitosan is dissolved in 1% glacial acetic acid to form a chitosan solution at a concentration of 0.8-1 g/100 mL, the chitosan solution has a viscosity of 20-30 mPa·s, and a degree of deacetylation of 85-95%. When the concentration is 1 g/100 mL, the viscosity is 27.5 mPa·s.

When the high-viscosity fermentation broth has a viscosity of 200-250 mPa·s, the chitosan is added to the high-viscosity fermentation broth to a concentration of 0.6-1.0 g/L, heated to a temperature of 30-50° ° C., and left to stand for 20-30 mins to flocculate and remove the cells, the cell protein being recycled.

When the high-viscosity fermentation broth has a viscosity of 250-350 mPa·s, the chitosan is added to the high-viscosity fermentation broth to a concentration of 0.8-1.0 g/L, heated to a temperature of 40-50° C., and left to stand for 20 mins to flocculate and remove the cells, the cell protein being recycled.

In step (2) of the protein removal, the resultant fermentation broth after the removal of cells is adjusted to pH of 8-9 with NaOH solution at a concentration of 6-10 mol/L, left to stand for 15-30 mins, and centrifuged at a speed of 4,000-5,000 rpm. Supernatant is collected, added with alkaline protease, heated and maintained at 40-50° C. for 2-3 hrs. The protease is deactivated at 85-95° ° C. for 1-5 mins. The protein is removed by centrifugation at a speed of 4,000-5,000 rpm.

Preferably, an amount of 80-100 U/mL alkaline protease is added in step (2).

In step (3) of the decolorization, a preferred way is static adsorption. Specifically, the resultant fermentation broth after removal of cells and protein is adjusted to a pH of 3-5 with HCl solution at a concentration of 4-7 mol/L, added with macroporous resin, heated and maintained at a certain temperature, stirred (at a speed of 180-220 rpm) for 1-3 hrs to adsorb to remove pigments. Then the macroporous resin is filtered and recycled.

Another preferred way is dynamic adsorption. Specifically, the resultant fermentation broth after removal of cells and protein is adjusted to a pH of 3-5 with HCl solution at a concentration of 4-7 mol/L, and then loaded into macroporous resin exchange column at a flow rate of 5-15 BV/h and a column volume of 10-15 BV. Then effluent is collected. It is heated and maintained at the temperature of 20-40° C. In the preferred dynamic adsorption, 3-10 g macroporous resin per 100 mL fermentation broth is added. Preferably, the model of the macroporous resin is LX-68M.

In step (4) of the ion removal by an ultrafiltration membrane module, a preferred method is as follows: the resultant fermentation broth after the removal of cells and protein and the decolorization is subjected to ultrafiltration for desalination by an ultrafiltration membrane module with a molecular weight cut-off of 1,000-10,000 Da under an operating pressure of 0.20-0.40 MPa, followed by which 0.5-1.0 time the volume of distilled water being added to retentate. Ultrafiltration is repeated 6-8 times as above until pullulan polysaccharide reaches a concentration of 5-8 g/100 mL, the mass content of monosaccharides, disaccharides and oligosaccharides is less than 10% based on glucose in the solution, and the conductivity of the solution is 50-300 μs/cm.

In step (5), in order to improve the efficiency of the drying, crushing, and packaging processes, the pullulan polysaccharide solution from step (4) can be concentrated by rotary evaporation to a polysaccharide concentration of 10-20 g/100 mL, then spread into a layer of 0.2-1.2 mm thick and dried to constant weight, and finally crushed and packaged to obtain the final product of pullulan polysaccharide.

The drying method is vacuum drying.

The specific parameters of the vacuum drying process are as follows: the vacuum is −0.08 MPa to −0.1 MPa, the drying temperature is 60-70° C., and the drying time is 2-6 hrs.

The principle of the technical solution according to the present application is as follows.

Various proteins differ in the composition of amino acid residues. When the solution is under a particular pH, the positive and negative charges of proteins are exactly equal (the total net charge is zero). As there is no mutual repulsion of the same charge, the proteins are the most unstable, the least soluble, and are very easy to quickly combine into larger aggregates by electrostatic attraction, and precipitate out. At the same time, the viscosity, permeability, swelling property, and electrical conductivity of the proteins are all minimized. Therefore, it is possible to separate and purify protein molecules with different electrically charged properties, sizes and shapes.

The beneficial effects of the technical solution according to the present application are as follows.

1. Use of natural polymer bioflocculant, chitosan flocculant, to flocculate and remove cells in the high-viscosity pullulan polysaccharide fermentation broth with a viscosity of 200-350 mPa's can reduce the water consumption by half. It can avoid the introduction of inorganic flocculants and solid filter aids causing solid wastes and environmental pollution. It can also recycle the high-protein cells to make cell feed additives, so there is no waste. It can also flocculate to remove part of the pigments, reducing pressure on the subsequent decolorization treatment.

2. According to the method of the present application, by using natural polymer bioflocculant chitosan, the high-viscosity pullulan polysaccharide fermentation broth with a viscosity of 200-350 mPa·s can be processed without being diluted, which reduces water consumption by half. A small amount of chitosan can flocculate to remove the cell impurities in the fermentation broth. At the same time, chitosan can also adsorb part of the pigments, which reduces pressure on the subsequent decolorization treatment. It can avoid the introduction of inorganic flocculants and solid filter aids causing solid wastes and environmental pollution.

3. The isoelectric point-enzyme method is used to remove proteins from the fermentation broth. The time for maintaining temperature is short, which not only avoids long-term heat denaturation to remove proteins, but also avoids use of inorganic and organic chemical reagents to remove proteins which results in reagent residues.

4. Macroporous resin is used to adsorb pigments in the fermentation broth, which is easy to operate, has good protein removal effect, excellent decolorization effect and high decolorization efficiency. The resin can be regenerated and reused many times, saving costs.

5. The pullulan polysaccharide extraction method according to the present application obtains pullulan polysaccharide with high purity, improving product yield and quality, reducing solid waste, reducing production costs. The production process enables safety, high efficiency, continuity and automation. The yield of the product can reach 90-95% and the purity is 92-97%, thus the product has good quality.

BRIEF DESCRIPTION OF THE DRAWINGS

FIG. 1 shows a flow chart of the method for extracting pullulan polysaccharide according to the present application.

DETAILED DESCRIPTION OF THE EMBODIMENTS

The present application will be described more clearly and completely through the following examples, which are only parts, not all, of the examples of the present application. The examples aim to assist in understanding and are not intended to limit the present application.

In order to achieve the above objects, the following technical solutions are provided in the present application:

Example 1

(1) Removal of cells: a high-viscosity fermentation broth (200 mPa·s) was adjusted to a pH of 5 with HCl solution at a concentration of 6 mol/L, added with chitosan to a content of 1.0 g/L, maintained at 30° C., left to stand for 10 mins, and centrifuged at a speed of 4,000 rpm to remove cells and insoluble substances.

(2) Removal of proteins: the resultant fermentation broth after the removal of the cells was adjusted to a pH of 8.2 with NaOH solution at a concentration of 6 mol/L, left to stand for 15 mins, centrifuged (at a speed of 5,000 rpm). Supernatant was collected and added with 80 U/mL alkaline protease, maintained at a temperature of 40° ° C. for 2 hrs and then at 90° C. for 5 mins to inactivate the protease, centrifuged (at a speed of 5,000 rpm) to remove proteins and residual the chitosan floccule.

(3) Decolorization by macroporous resin: the resultant fermentation broth after the removal of the cells and the proteins was adjusted to a pH of 3 with HCl solution at a concentration of 6 mol/L, added with 5 g/100 mL macroporous resin (LX-68M), heated and maintained at 30° C., stirred (at a speed of 220 rpm) for adsorption for 1.5 hrs to remove pigments, and then filtered to recycle the macroporous resin.

(4) Removal of ion: the resultant fermentation broth after the removal of the cells and the proteins and the decolorization was subjected to ultrafiltration for desalination by sequentially flowing through the ultrafiltration membrane modules with the molecular weight cut-off of 5,000 Da and 10,000 Da under an operation pressure of 0.20 MPa. Then 1.0 time the volume of distilled water was added to the retentate (concentrated fermentation broth). Ultrafiltration was repeated for 8 times as above until the concentration of salts and other small molecules in the solution meet the standard, that is, the mass concentration of monosaccharides, disaccharides and oligosaccharides was less than 10% based on glucose in the solution, the conductivity of the solution was that of distilled water and tap water, i.e., 50-300 μs/cm, and the concentration of pullulan polysaccharide reached 8 g/100 mL.

(5) Drying: the pullulan polysaccharide solution from step (4) was concentrated by rotary evaporation to a polysaccharide concentration of 15 g/100 mL, then spread into a layer of 0.5 mm thick under −0.09 MPa, dried to constant weight at 65° C., and finally crushed and packaged, obtaining the final product of pullulan polysaccharide.

According to the above extraction method, the extraction yield of pullulan polysaccharide can reach 90.8%, the purity was 95%, and the recycling rate of the cell protein was 12.4%.

Example 2

(1) Removal of cells: a high-viscosity fermentation broth (250 mPa·s) was adjusted to a pH of 3 with HCl solution at a concentration of 5 mol/L, added with chitosan to a content of 0.8 g/L, maintained at 40° C., left to stand for 20 mins, and centrifuged at a speed of 5,000 rpm to remove cells and insoluble substances.

(2) Removal of proteins: the resultant fermentation broth after the removal of cells was adjusted to a pH of 8.5 with NaOH solution at a concentration of 10 mol/L, left to stand for 20 mins, centrifuged (at a speed of 5,000 rpm). Supernatant was collected and added with 100 U/mL alkaline protease, maintained at a temperature of 40° ° C. for 2.5 hrs and then at 90° C. for 5 mins to inactivate the protease, centrifuged (at a speed of 5,000 rpm) to remove the proteins and residual chitosan floccule.

(3) Decolorization by macroporous resin: the resultant fermentation broth after the removal of the cells and the proteins was adjusted to a pH of 3 with HCl solution at a concentration of 5 mol/L, and loaded into macroporous resin (LX-68M) column at a column volume of 15 BV and a flow rate of 5 BV/h. Then the effluent is collected.

(4) Removal of ion: the resultant fermentation broth after the removal of the cells and the proteins and the decolorization was subjected to ultrafiltration for desalination by sequentially flowing through the ultrafiltration membrane modules with the molecular weight cut-off of 3,000 Da and 10,000 Da under an operation pressure of 0.40 MPa. Then 1.0 time the volume of distilled water was added to the retentate. Ultrafiltration was repeated for 6 times as above until the concentration of salts and other small molecules in the solution meet the standard, and the concentration of pullulan polysaccharide reached 7 g/100 mL.

(5) Drying: the pullulan polysaccharide solution from step (4) was concentrated by rotary evaporation to a polysaccharide concentration of 20 g/100 mL, then spread into a layer of 0.8 mm thick under −0.10 MPa, dried to constant weight at 60° C., and finally crushed and packaged to obtain the final product of pullulan polysaccharide.

According to the above extraction method, the extraction yield of pullulan polysaccharide can reach 93%, the purity was 94.5%, and the recycling rate of cell protein r was 12.1%.

Example 3

(1) Removal of cells: a high-viscosity fermentation broth (280 mPa·s) was adjusted to a pH of 4 with HCl solution at a concentration of 7 mol/L, added with chitosan to a content of 0.9 g/L, maintained at 40° C., left to stand for 20 mins, and centrifuged at a speed of 5,000 rpm to remove cells and insoluble substances.

(2) Removal of proteins: the resultant fermentation broth after the removal of cells was adjusted to a pH of 8.3 with NaOH solution at a concentration of 8 mol/L, left to stand for 20 mins, centrifuged (at a speed of 5,000 rpm). Supernatant was collected and added with 90 U/mL alkaline protease, maintained at a temperature of 45° C. for 3 hrs and then at 90° C. for 5 mins to inactivate the protease, centrifuged (at a speed of 5,000 rpm) to remove the proteins and residual chitosan floccule.

(3) Decolorization by macroporous resin: the resultant fermentation broth after the removal of the cells and the proteins was adjusted to a pH of 3 with HCl solution at a concentration of 5 mol/L, and loaded into macroporous resin (LX-68M) column at a column volume of 10 BV and a flow rate of 10 BV/h. Then the effluent is collected.

(4) Removal of ion: the resultant fermentation broth after the removal of the cells and the proteins and the decolorization was subjected to ultrafiltration for desalination by sequentially flowing through the ultrafiltration membrane modules with the molecular weight cut-off of 1,000 Da and 5,000 Da under an operation pressure of 0.30 Mpa. Then 1.0 time the volume of distilled water was added to the retentate. Ultrafiltration was repeated for 7 times as above, to ensure that the concentration of salts and other small molecules in the solution meet the standard, and the concentration of pullulan polysaccharide reached 10 g/100 mL.

(5) Drying: the pullulan polysaccharide solution from step (4) was concentrated by rotary evaporation to a polysaccharide concentration of 10 g/100 mL, then spread into a layer of 1.0 mm thick under −0.08 MPa, dried to constant weight at 70° C., and finally crushed and packaged to obtain the final product of pullulan polysaccharide.

According to the above extraction method, the extraction yield of pullulan polysaccharide can reach 94.2%, the purity was 93.2%, and the recycling rate of cell protein was 12.76%.

Comparison of the effect of the conventional process (for removal of cells) with the present application are as follows.

TABLE 1

Differences for removal of cells between natural polymer chitosan flocculation and conventional plate and frame filtration

|  | Traditional method | Method according to the present application |
| --- | --- | --- |
| Diatomite (g) | 30.0 g/L | — |
| water consumption (L) | 1.0 L/L | — |
| Protein recycling rate (g/100 g) | — | 12.76% |

What is claimed is:

1. A method for extracting pullulan polysaccharide from a fermentation broth having a viscosity of 200-350 mPa·s, wherein the method comprises following steps:
   (1) removal of cells from the fermentation broth, comprising: adjusting the fermentation broth to a pH of 3-5 with HCl solution, adding chitosan dissolved in glacial acetic acid, heating to a temperature of 30-50° C., leaving to stand for 10-30 mins at the temperature of 30-50° C. for flocculating, and centrifuging to remove the cells and insoluble substance, so as to obtain a cell-free fermentation broth;
   (2) removal of proteins, comprising: adjusting the cell-free fermentation broth to a pH of 8-9 with NaOH solution, leaving to stand for 15-30 mins for precipitating, centrifuging, then adding alkaline protease in supernatant, heating to a temperature of 40-50° C. for 2-3 hrs, deactivating the protease, and centrifuging to remove the proteins;
   (3) decolorization, comprising: adjusting a resultant fermentation broth from step (2) to a pH of 3-5 with HCl solution, adding macroporousresin therein, heating to 30° C. for 1.5 hrs under stirring, so as to remove pigments, and then filtering to recycle the macroporous resin;
   (4) removal of ions by an ultrafiltration membrane module, comprising: subjecting a resultant fermentation broth from step (3) to ultrafiltration for desalination through the ultrafiltration membrane module, and repeatedly the ultrafiltration until pullulan polysaccharide reaches a concentration of 5-8 g/100 mL; and
   (5) drying, crushing and packaging.

2. The method for extracting pullulan polysaccharide according to claim 1, wherein, in step (1), the fermentation broth containing the chitosan is centrifuged at a speed of 4000-5000 rpm to recycle cell proteins; and the chitosan is dissolved in 1% glacial acetic acid, and the concentration of the chitosan in the fermentation broth is 0.6-1.0 g/L according to mass-to-volume ratio.

3. The method for extracting pullulan polysaccharide according to claim 2, wherein, when the chitosan is dissolved in the 1% glacial acetic acid to form a chitosan solution at a concentration of 0.8-1 g/100 mL, the chitosan solution has a viscosity of 20-30 mPa·s, and a degree of deacetylation of 85-95%.

4. The method for extracting pullulan polysaccharide according to claim 2, wherein, in step (1), when the fermentation broth has a viscosity of 200-250 mPa·s, the chitosan is added to the fermentation broth to a concentration of 0.6-1.0 g/L, heated to a temperature of 30-50° C., and left to stand for 20-30 mins for flocculating, so as to remove the cells and recycle the cell protein.

5. The method for extracting pullulan polysaccharide according to claim 2, wherein, in step (1), when the fermentation broth has a viscosity of 250-350 mPa·s, the chitosan is added to the fermentation broth to a concentration of 0.8-1.0 g/L, heated to a temperature of 40-50° C., and left to stand for 20 mins for flocculating, so as to remove the cells and recycle the cell protein.

6. The method for extracting pullulan polysaccharide according to claim 1, wherein, in step (2), the cell-free fermentation broth is adjusted with 6-10 mol/L NaOH solution, centrifuged at a speed of 4000-5000 rpm; and the supernatant is added with 80-100 U/mL alkaline protease; the protease is deactivated at 85-95° C. for 1-5 mins; and the protein is removed by centrifugation at a speed of 4000-5000 rpm.

7. The method for extracting pullulan polysaccharide according to claim 1, wherein, the decolorization in step (3) is dynamic resin adsorption, comprising following steps: the resultant fermentation broth from step (2) being adjusted to a pH of 3~5 with HCl solution, and being loaded into macroporous resin exchange column at a flow rate of 5-15 BV/h and a column volume of 10-15 BV, and effluent being collected; wherein in dynamic adsorption, 3-10 g adsorption resin per 100 mL fermentation broth is used.

8. The method for extracting pullulan polysaccharide according to claim 7, wherein a model for the macroporous resin is LX-68M.

9. The method for extracting pullulan polysaccharide according to claim 1, wherein in each step of the extraction method, in steps (1) and (3), HCl used to adjust pH has a concentration of 4~7 mol/L; and in step (3), when heating and maintaining temperature, the stirring speed is 180~220 rpm, and adsorption time is 1-3 hrs.

10. The method for extracting pullulan polysaccharide according to claim 1, wherein, in step (4), the resultant fermentation broth is subjected to ultrafiltration for desalination by the ultrafiltration membrane module with a molecular weight cut-off of 1,000-10,000 Da under an operating pressure of 0.20-0.40 MPa, followed by which 0.5-1.0 times the volume of distilled water is added to retentate, and the ultrafiltration is repeated for 6-8 times until the mass concentration of monosaccharides, disaccharides and oligosaccharides is less than 10% based on glucose in the solution, the conductivity of the solution is 50-300 μs/cm, and the concentration of pullulan polysaccharide reaches 5-8 g/100 mL.

11. The method for extracting pullulan polysaccharide according to claim 1, wherein the drying in step (5) comprises: concentrating the resultant pullulan polysaccharide solution from step (4) by rotary evaporation to a polysaccharide concentration of 10-20 g/100 mL, then spreading it into a layer of 0.2-1.2 mm thick, drying to constant weight by vacuum.

* * * * *